(12) United States Patent
Lam et al.

(10) Patent No.: US 6,762,862 B2
(45) Date of Patent: Jul. 13, 2004

(54) HIGH RESOLUTION SCANNER

(75) Inventors: Kai Yiu Lam, Torrance, CA (US); Loi Han, Alhambra, CA (US)

(73) Assignee: Microtek International, Inc., Hsinchu (TW)

( * ) Notice: Subject to any disclaimer, the term of this patent is extended or adjusted under 35 U.S.C. 154(b) by 567 days.

(21) Appl. No.: 09/745,815

(22) Filed: Dec. 21, 2000

(65) Prior Publication Data

US 2001/0013957 A1 Aug. 16, 2001

Related U.S. Application Data

(63) Continuation-in-part of application No. 09/136,985, filed on Aug. 20, 1998, now Pat. No. 6,239,883.

(51) Int. Cl.[7] .................................................. H04N 1/04
(52) U.S. Cl. ........................ 358/482; 481/511; 481/513
(58) Field of Search ................................ 358/474, 471, 358/401, 475, 505, 506, 509, 511, 513, 481, 482, 483, 486, 493, 494, 497

(56) References Cited

U.S. PATENT DOCUMENTS

| | | | |
|---|---|---|---|
| 4,982,236 A | 1/1991 | Bock | |
| 5,574,274 A | 11/1996 | Rubley | |
| 5,724,159 A | 3/1998 | Nakagawa | |
| 5,734,477 A | * 3/1998 | Tsai | 358/296 |
| 5,886,342 A | * 3/1999 | Matsui | 250/208.1 |
| 6,009,292 A | 12/1999 | Jinbo | |
| 6,101,003 A | 8/2000 | Wu | |
| 6,111,666 A | 8/2000 | Yoshinaga | |
| 6,144,465 A | 11/2000 | Hayashi | |
| 6,147,777 A | 11/2000 | Jung | |
| 6,151,422 A | * 11/2000 | Hayduchok et al. | 382/286 |

* cited by examiner

Primary Examiner—Jerome Grant, II
(74) Attorney, Agent, or Firm—Jon Hokanson, Esq.; Coudert Brothers LLP

(57) ABSTRACT

An improved high resolution scanner for use in a conventional scanner housing. A plurality of mirrors, including a two-position switchable mirror adapted to sequentially scan a first column, and then a second column, is mounted on a carriage which also includes a conventional lens and CCD for sequentially scanning an object to be scanned in a two-pass scan. The resulting scanned portions, when combined, produce a high resolution image of the scanned image.

8 Claims, 3 Drawing Sheets

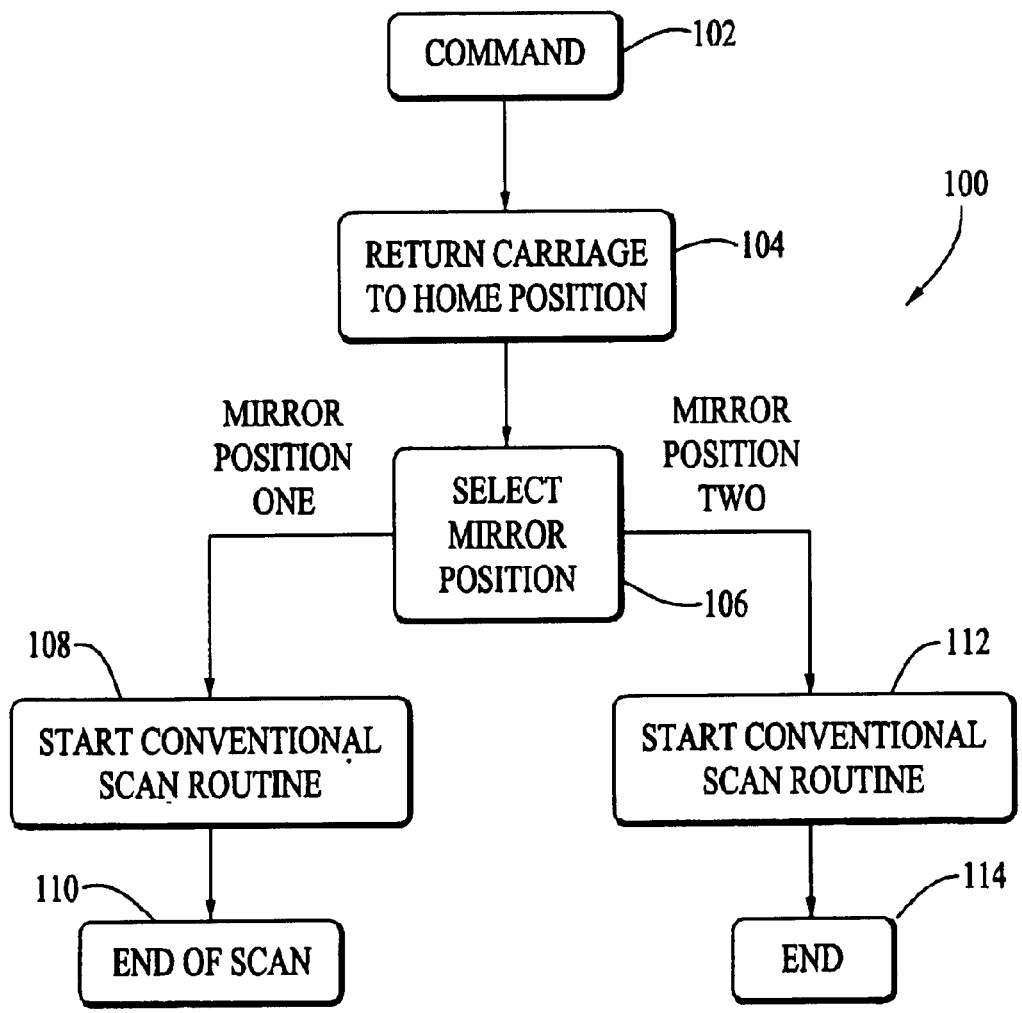

HIGH RESOLUTION SCANNER

RELATED APPLICATION

This application is a continuation-in-part of application Ser. No. 09/136,985 filed Aug. 20, 1998, now U.S. Pat. No. 6,239,883, which is incorporated by reference herein.

BACKGROUND OF THE INVENTION

1. Field of the Invention

The present invention relates to high resolution optical scanners and, more particularly, to a high resolution scanning mechanism for use in a conventional flat bed optical scanner.

2. Description of the Prior Art

Optical scanners are available in a variety of configurations, tailored to the needs of the user. A conventional flat bed scanner includes a light-receiving device mounted in a light-receiving seat, typically a carriage mounted on rails within the scanner housing and is movably adjusted along the rails for scanning line-by-line documents, photographs, transparencies, etc. The light-receiving device includes mirrors and a lens for focusing the image upon an electro-optic transducer, also known as a charge coupled device (CCD) which then converts the light images into electrical signals. These signals are then digitized for use by a computer for reproduction and manipulation of the digitized image by commercially available software. In conventional scanners, the CCD is centrally mounted within the light-receiving device. The device may also include the use of a focusing mechanism for adjusting the distance between the lens and the CCD. While these devices are suitable for low resolution document reproduction, they are unable to provide the necessary resolution required for use with multimedia and digital photographic processing applications.

High resolution optical scanners have been proposed which are generally of a high cost due to the number of CCDs required for high resolution. CCD resolution is determined by the number optical sensors or pixels located linearly across the viewing area. These CCDs can be manufactured to obtain the desired high resolution by increasing the number of pixels per inch. However, high resolution CCDs are not readily available due to the high costs associated with these types of devices. Thus, it would be desirable to provide a high resolution scanner at a low production cost for use by a variety of users.

OBJECTS AND SUMMARY OF THE INVENTION

The primary object of the present invention is to provide a high resolution scanning mechanism for use with a conventional CCD to increase the resolution of the CCD when scanning documents, transparencies and photographs.

Another object of the present invention is to provide a control program for use in a scanner central processing unit to control a motorized high resolution scanning mechanism including a switch mirror to scan documents at high resolutions within a conventional scanner.

The present invention is a mechanism and method for high resolution scanning within a conventional scanner, using a conventional CCD-type image processing device. The mechanism includes a set of mirrors which scan one-half the width of the platen on each pass and focus the one-half width onto the CCD. Upon completion of the first pass, a mirror is switched to direct the image from the other half of the platen onto the CCD. Conventional stitching software is used to align the images without overlap. By this structure and method the resolution of the scanning is increased by a factor of two, but at the expense of having to scan the object twice. Software provided with the scanning device stores each column from the object to be scanned within memory. After the scanner scans in a first column of data, the carriage then returns and scans the remaining column. When the object has been completely scanned, software within the scanner provides the necessary processing for combining the columns of data into one image. With each column scanned at the conventional resolution, the combined image from the columns is at a higher resolution. The resolution achieved from two columns is greater than in normal scanning methods using the same CCD. Thus, a relatively low cost, high resolution scanner is achieved using a conventional CCD. In addition, the mechanism provides a way for upgrading existing scanners to include a high resolution capability by exchanging the existing carriage and software with the present invention.

BRIEF DESCRIPTION OF THE DRAWINGS

The objects and advantages of the present invention will become more readily apparent to those of ordinary skilled in the art after reviewing the following detailed description and accompanying documents wherein:

FIG. 3 is a flow chart showing processing for a computer software routine to control operation of the scanner of the preferred embodiment of the present invention.

DESCRIPTION OF THE PREFERRED EMBODIMENTS

The present invention is intended to be incorporated into a flat bed scanner of the reflective and/or transmissive type. Such scanners are well-known and include a housing, a platen, a carriage mounted on rails inside of the housing for reciprocating movement within the housing along its lengthwise direction. A scanning camera which includes a lens and a CCD is mounted on the carriage. A light source and a set of mirrors for directing light from the platen to the CCD are also typically mounted on the carriage. The carriage is typically moved by a conventional stepping motor and the scanner operation is typically controlled by conventional computer implemented software and operator controls that are incorporated on the scanner and/or activated through the. These types of scanners and their light sources, subassemblies, mountings and software are well known in the art.

Figure 1:
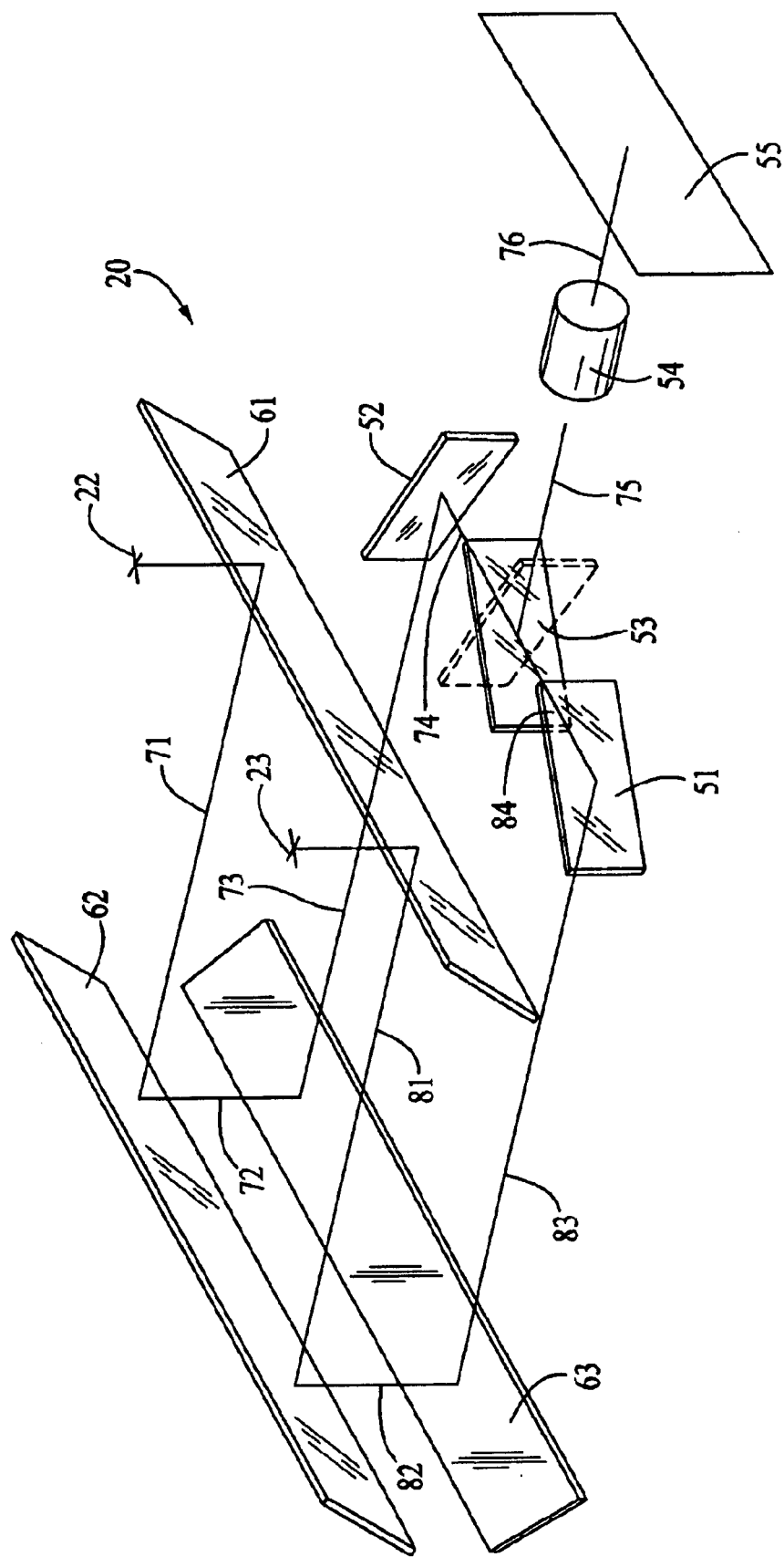
FIG. 1 is a exploded, perspective view of a mirror, lens and CCD subassembly of the preferred embodiment.
Figure 2:
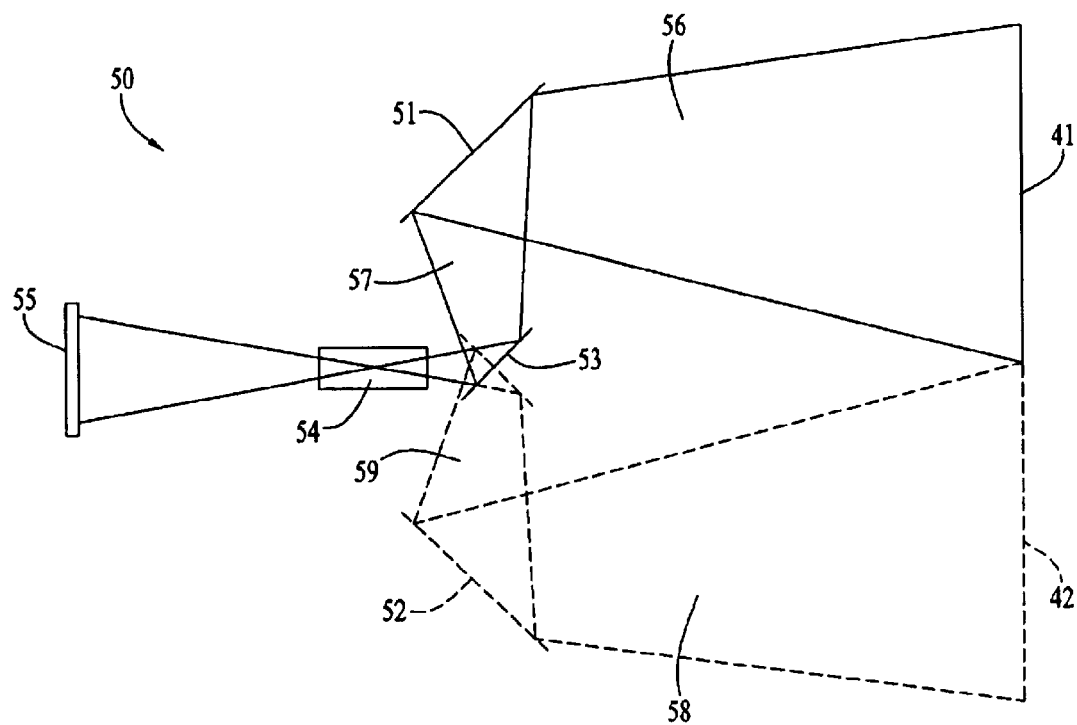
FIG. 2 is an schematic view of the FIG. 1 embodiment, showing the scanning widths achieved by the mechanism of the preferred embodiment.

With reference to FIGS. 1 and 2 a preferred mirror, camera and carriage subassembly of the present invention scanner will be described. Included within the scanner housing and positioned on a carriage is a set of mirrors 61, 62, 63, 51, 52 and 53, and a lens 54 for focusing the received light from the image to be scanned upon a CCD 55. The mirrors are mounted in a conventional manner. Mirror 53 is a switch mirror that is mounted in a conventional manner so that it may be switched from a first position to a second position during scanning, as will be described in detail. The lens 54 and CCD 55 are also mounted on the carriage (not shown).

With reference to FIG. 1, two paths for light from the platen through the subassembly 20 will described. The mirrors are sized and positioned so that the rectangular area of the platen is divided into two columns, with the length of the column along the direction of reciprocation of the carriage. The reflected/transmitted light from one column is transmitted to the CCD via a first light path and reflected/transmitted light from the second column is transmitted to the CCD via the second light path. Light is reflected from or transmitted through the first column beginning from the platen at 22, and the second column beginning from the platen at 23. The light is then reflected off of mirror 61 and toward mirror 62, as shown by lines 71 and 81 which represent the first path and second path, respectively. Light is then reflected from mirror 62 to mirror 63, as shown by light path lines 72 and 82. Light is then reflected from mirror 63 to mirrors 51 and 52, as shown by light path lines 73 and 83. Light is reflected from both of the mirrors 51 and 52 toward switch mirror 53 as shown by light path lines 74 and 84. At this point light from only one of the mirrors, either 51 or 52, is reflected from the switch mirror 53, depending upon which position the mirror is set. As shown in FIG. 1, mirror 53 is positioned, in solid lines, to reflect only the light from mirror 51. The light from mirror 53 then passes to the lens 54 via the light path shown at line 75, through lens 54, and then to the CCD, shown schematically at 55.

In the configuration shown in FIG. 1, only the light from one column, i.e., one-half the width of the platen is transmitted to the CCD during a single pass of the carriage along the length of the scanner. This beam of light travels from 23 via the second path, shown by lines 81, 82, 83 and 84 to the switch mirror 53. The light from the plane of the platen out the other half of the width of the platen, i.e., the other column, is transmitted to CCD. This beam travels down the first path, shown by lines 71, 72, 73 and 74 to the switch mirror 53 (shown in dashed lines).

A conventional central processing unit (CPU) (not shown) connected within the scanner controls the movement of carriage along the rails and the scanning, except for the CPU implemented processing steps specific to the two-column scanning as described herein and illustrated in FIG. 3.

The two-column scanning of the present invention is schematically illustrated in FIG. 2, with the width of one column illustrated at 41 and the width of the other column at 42. A beam of light 56 of corresponding single column width is transmitted to the mirror 51. The beam is reflected from mirror 51 to form a beam 57 which is transmitted to the switch mirror 53. The light is then focused onto CCD 55 through lens 54. The other path is shown in dashed lines. The corresponding column width is shown at 42, the first beam at 58, the mirror 52, and the second beam 59 to switch mirror 53 is also shown. Operation:

With reference to FIG. 3, CPU implemented scanning operation 100 will be described. For scanning of the first column, the scanner carriage is positioned at a first end of the scanner housing, an object to be scanned, typically a sheet of paper, is placed on the platen and an operator controlled command start switch begins the scanning of the object. With respect to this positioning, the scanner CCD is allowed to scan the first column of the object at the desired scan resolution that is conventionally available for that CCD. For a 4800-pixel CCD, typical resolution is approximately 600 dots per inch (DPI). As may be appreciated, the resolution of the scanning of the entire width of the platen is increased by a factor of two. In conventional, single pass scanning of the entire width of the platen, a typical resolution of about 600 DPI is achieved. With the present invention the resolution can be increased to about 1200 DPI with the same CCD.

The CCD and lens have been adjusted in a conventional manner such that the field range is narrowed to be about one-half of the width of the platen. The scanner command start 102 is activated and the carriage is returned to the home position at the first end of the scanner at 104. Next the switch mirror 53 is placed in the first (solid line) position at step 106 and as shown in FIGS. 1–2. Then conventional scanning of the first column begins and continues at 108 so that the mirror, lens and CCD subassembly scans into memory a column of the object representing about one-half of the total width of the platen, which in the typical case will also be about one-half the width of the scanned object.

Scanning continues until the entire column is scanned and then the end of the first column of scanning occurs at 110.

The switch mirror 53 is then switched to the other position at 106 and scanning of the second column begins at 112. Scanning continues to the end at 114. The object is then removed, and the scanner is ready to have another object placed thereon, and scanned.

While the present invention has been described in connection with what are presently considered to be the most practical and preferred embodiments, it is to be understood that the invention is not to be limited to the disclosed embodiments, but to the contrary, is intended to cover various modifications and equivalent arrangements included within the spirit of the invention, which are set forth in the appended claims, and which scope is to be accorded the broadest interpretation so as to encompass all such modifications and equivalent structures.

What is claimed is:

1. A high resolution optical scanner for use in a flat bed scanner housing including a platen having a scanning area upon which an object to be scanned is placed, said platen having a length dimension and a perpendicular width dimension, said scanner comprising:
   a carriage movably mounted beneath said platen and adapted to be moved reciprocally parallel to said length dimension;
   a plurality of mirrors mounted in said carriage;
   a lens mounted in said carriage;
   an image optical sensor for converting an object image into electrical signals representative of said image mounted in said carriage;
   a switch mirror rotatably mounted in said carriage and adapted to be positioned in a first position and in a second position;
   a first optical pathway defining an optical path from said platen to at least one said mirror and from said mirror to said switch mirror positioned in said first position and from said switch mirror to and through said lens to said optical sensor;
   a second optical pathway defining an optical path from said platen to at least one said mirror and from said mirror to said switch mirror positioned in said second position and from said switch mirror to and through said lens to said optical sensor;
   said first optical pathway adapted to focus upon said optical sensor a first portion of said scanning area; and
   said second optical pathway adapted to focus upon said optical sensor a second portion of said scanning area.

2. The scanner of claim 1 further including:
   said first portion of said scanning area having a length equal to the length of the scanning area and a width equal to one-half the width of the scanning area.

3. The scanner of claim 1 further including:
   said first portion of said scanning area having a length equal to the length of the scanning area and a width equal to one-half the width of the scanning area;

said second portion of said scanning area having a length equal to the length of the scanning area and a width equal to one-half the width of the scanning area; and said second portion is adjacent to said first portion.

4. The scanner of claim 1 further including:

at least one light source for illuminating said object to be scanned mounted on said carriage.

5. The scanner of claim 1 further including:

a computer processor and executable program to process said electrical signals from said optical sensor representative of an object image in said first portion and electrical signals from said optical sensor representative of an object image in said second portion to provide a single object image of higher resolution.

6. The scanner of claim 1 further including:

a computer processor and executable program to control said scanner.

7. The scanner of claim 1 further including:

said optical sensor is a charge coupled device.

8. A method of scanning an object to produce a high resolution image of said object comprising the steps of:

providing a housing having a scanning area;

providing within said housing a carriage movable with respect to an object to be scanned;

providing at least one mirror mounted in said carriage;

providing a lens mounted in said carriage;

providing an image optical sensor for converting an object image into electrical signals representative of said image mounted in said carriage;

providing a switch mirror rotatably mounted in said carriage;

providing an optical pathway defining an optical path from said object to said mirror and from said mirror to said switch mirror and from said switch mirror to and through said lens to said optical sensor;

providing a computer processor mounted in said housing and operationally connected to said carriage, said switch mirror and said optical sensor;

providing a control program executed by said computer processor for controlling scanning and object image processing;

placing an object within said scanning area;

positioning said switch mirror to a first position to direct illuminance from a first one-half of said scanning area to said optical sensor;

scanning the portion of said object within said first one-half of said scanning area to produce a first object image;

processing and storing said first object image within said computer processor and control program;

positioning said switch mirror to a second position to direct illuminance from a second one-half of said scanning area to said optical sensor;

scanning the portion of said object within said second one-half of said scanning area to produce a second object image;

processing and storing said second object image within said computer processor and control program;

processing said first object image and said second object image together within said computer processor and said control program to produce a high resolution image of the scanned object.

* * * * *